United States Patent [19]
Carter et al.

[11] Patent Number: 4,493,986
[45] Date of Patent: Jan. 15, 1985

[54] PISTOL GRIP ELECTRICAL BRAZING TOOL

[75] Inventors: Daniel L. Carter, Armuchee; Homer H. Hall, Rome, both of Ga.

[73] Assignee: General Electric Company, King of Prussia, Pa.

[21] Appl. No.: 508,756

[22] Filed: Jun. 28, 1983

[51] Int. Cl.³ .............................................. B23K 1/04
[52] U.S. Cl. ............................ 219/85 D; 219/86.21; 219/85 R
[58] Field of Search ............ 219/85 R, 85 F, 85 CA, 219/85 CM, 86.21, 78.01

[56] References Cited

U.S. PATENT DOCUMENTS

| | | | |
|---|---|---|---|
| 1,280,818 | 10/1918 | Nikonow | 219/90 |
| 2,402,004 | 6/1946 | Adams | 219/90 |
| 2,542,629 | 2/1951 | Clawson | 219/230 |
| 4,205,221 | 5/1980 | Meyer | 219/85 D X |

Primary Examiner—C. L. Albritton
Assistant Examiner—Catherine M. Sigda
Attorney, Agent, or Firm—Robert A. Cahill; William Freedman

[57] ABSTRACT

A pistol grip brazing tool utilizes an insulative frame to mount a pair of elongated support elements, one fixed and the other reciprocating. The support elements, in turn, mount at their front ends a pair of electrodes in opposed relation and at their rear ends brazing cable connectors. Conductive links affixed to the support elements are adapted with interconnecting conductive cable lengths such as to conduct brazing current between the electrodes and the cable connectors in shunt relation with the support elements. The flow of brazing current is controlled to insure that brazing operations are performed without undue arcing.

8 Claims, 8 Drawing Figures

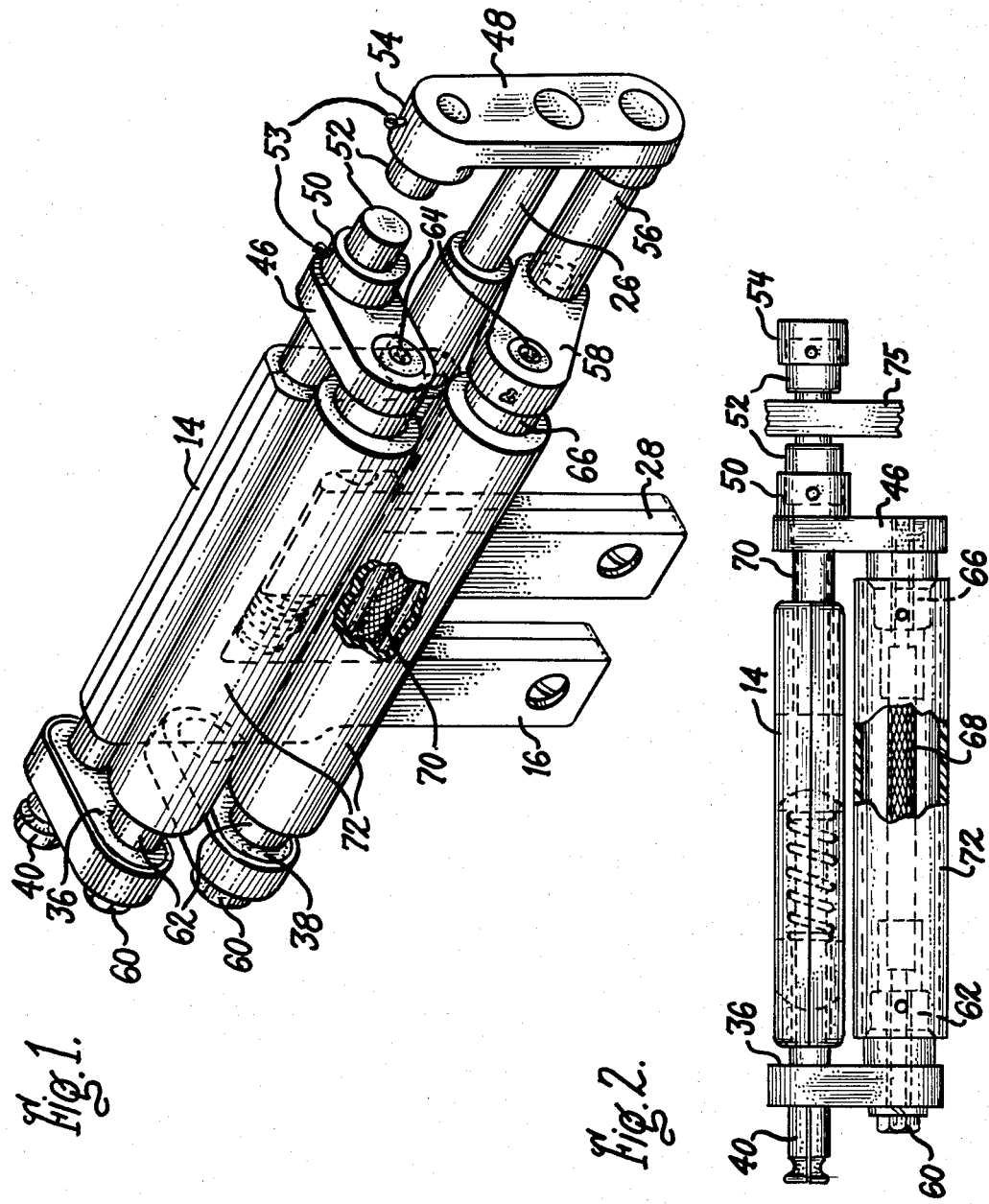

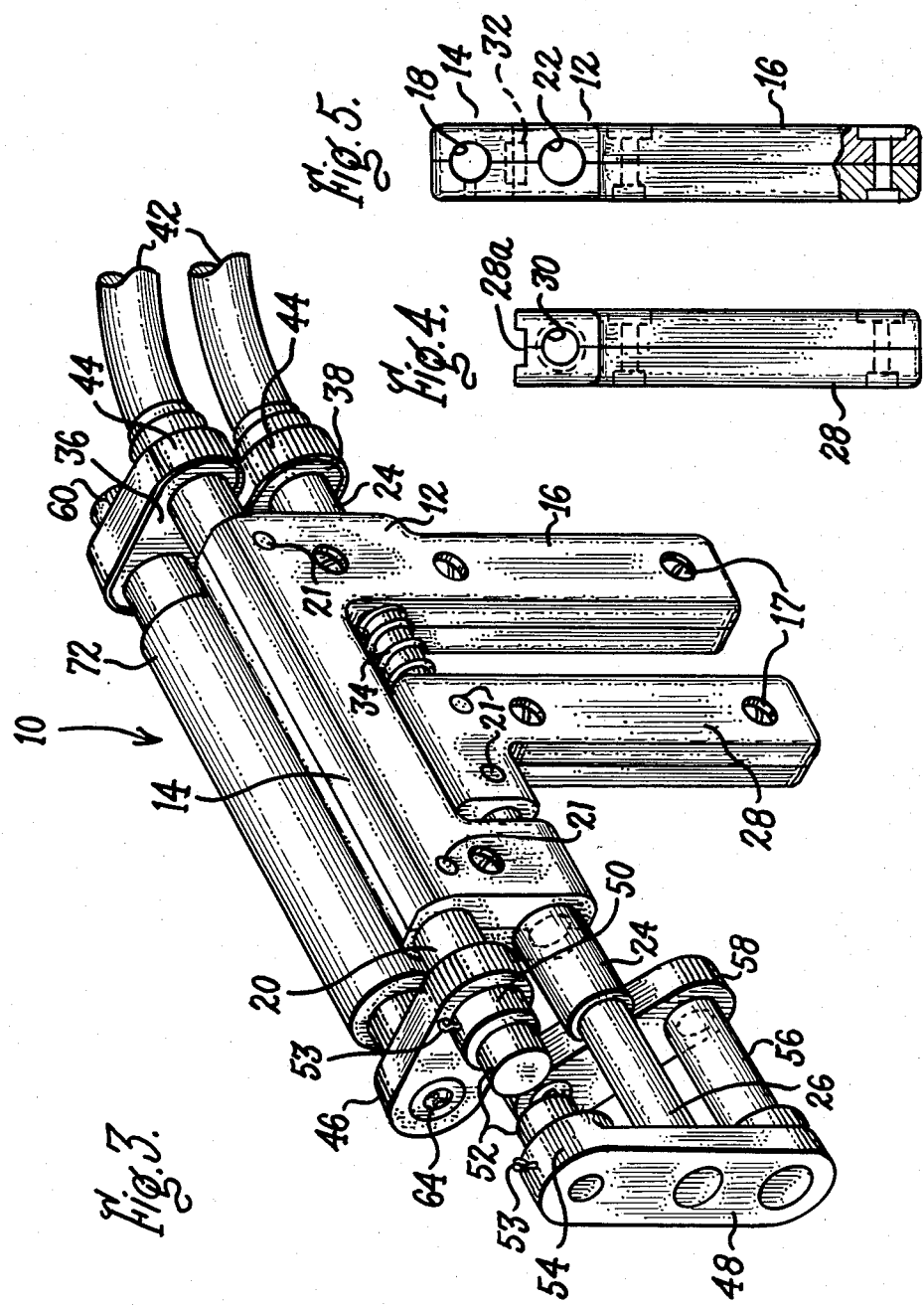

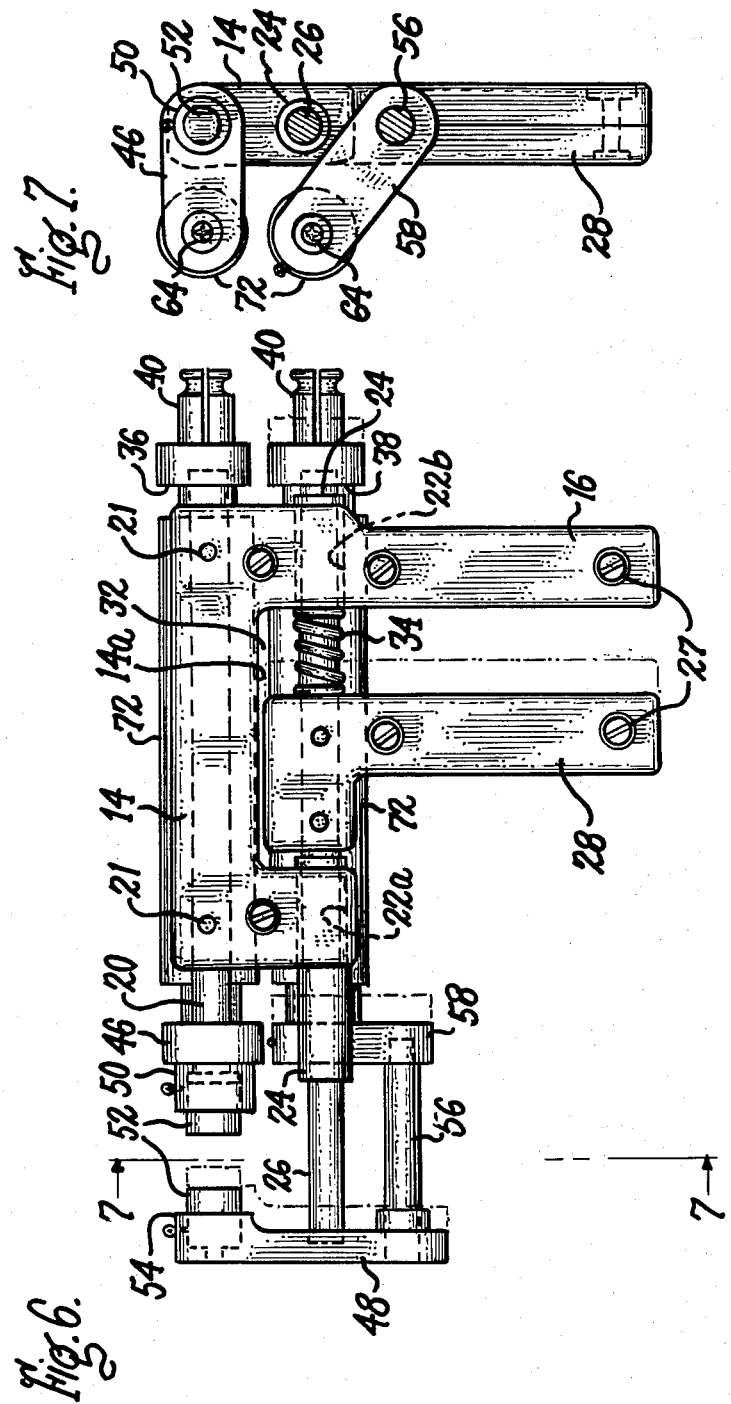

PISTOL GRIP ELECTRICAL BRAZING TOOL

REFERENCE TO RELATED APPLICATION

This application discloses an electrical brazing control circuit which is the subject of a commonly assigned U.S. application Ser. No. 508,685—Burnett et al. entitled ELECTRICAL BRAZING ANTI-ARCING CONTROL CIRCUIT (5D5855), filed concurrently herewith.

BACKGROUND AND OBJECTS OF THE INVENTION

The present invention relates to electrical brazing implements and particularly to a portable, hand-held tool for effecting a brazed joint between metallic parts.

Numerous manufacturing procedures call for brazed joints between metallic parts that cannot be readily effected using stationary brazing equipment. For example, in the manufacture of large power transformers, conductors being wound to produce the transformer coils must frequently be spliced or joined together. In this situation, a portable, hand-held brazing tool is the only practical answer to effecting such joints in an efficient and reliable manner. Moreover, as is often the case, the site where the joint is to be made can have limited access, and thus the brazing tool should be as streamlined and versatile as possible.

It is accordingly an object of the present invention to provide an improved, hand-held brazing tool which can be readily manipulated with one hand, leaving the other hand free to position the work.

A further object is to provide a brazing tool of the above-character which is compact, light weight and rugged in construction and safe and easy to use.

Other objects of the invention will, in part, be obvious and, in part, appear hereinafter.

SUMMARY OF THE INVENTION

In accordance with the present invention, there is provided an improved brazing tool of a pistol-like configuration including an L-shaped frame of structurally rigid insulative material having a longitudinally extending barrel and a laterally extending handle. Longitudinally passageways through the barrel accommodate a pair of elongated support elements, one of which serving to mount a trigger for disposal in parallel relation with the handle. A spring biases the handle and trigger apart. Affixed to the front and rearward ends of the support elements are laterally extending, electrically conductive links; the frontal ones supporting a pair of electrodes in spaced, longitudinally opposed relation and the rearward ones supporting a pair of brazing cable connectors. Separate brazing current carrying conductors are electrically connected between the links to route current flowing between the connectors and electrodes in shunting relation to the support elements. Thus the grip portion of the tool remains cool to the touch and is effectively isolated from the brazing current carrying parts. With one of the support elements affixed to the barrel, squeezing the handle and trigger together against the spring bias brings the electrodes into opposed, engaging relation with the work to effect a brazing operation in a safe, convenient and efficient manner.

The invention accordingly comprises the features of construction, combination of elements, and arrangement of parts which will be exemplified in the construction hereinafter set forth, and the scope of the invention will be indicated in the claims.

DESCRIPTION OF THE DRAWINGS

For a fuller understanding of the nature and objects of the invention, reference should be had to the following detailed description taken in conjunction with the accompanying drawings, in which:

FIG. 1 is a perspective view of an electrical brazing tool constructed in accordance with the present invention;

FIG. 2 is a top view of the brazing tool of FIG. 1;

FIG. 3 is a different perspective view of the brazing tool of FIG. 1;

FIG. 4 is an end view of the trigger utilized in the brazing tool of FIG. 1;

FIG. 5 is an end view of the pistol grip frame utilized in the brazing tool of FIG. 1;

FIG. 6 is a side elevational view of the brazing tool of FIG. 1;

FIG. 7 is a sectional view taken along line 7—7 of FIG. 6; and

Corresponding reference numerals refer to like parts throughout the several views of the drawings.

DETAILED DESCRIPTION

Figure 8:
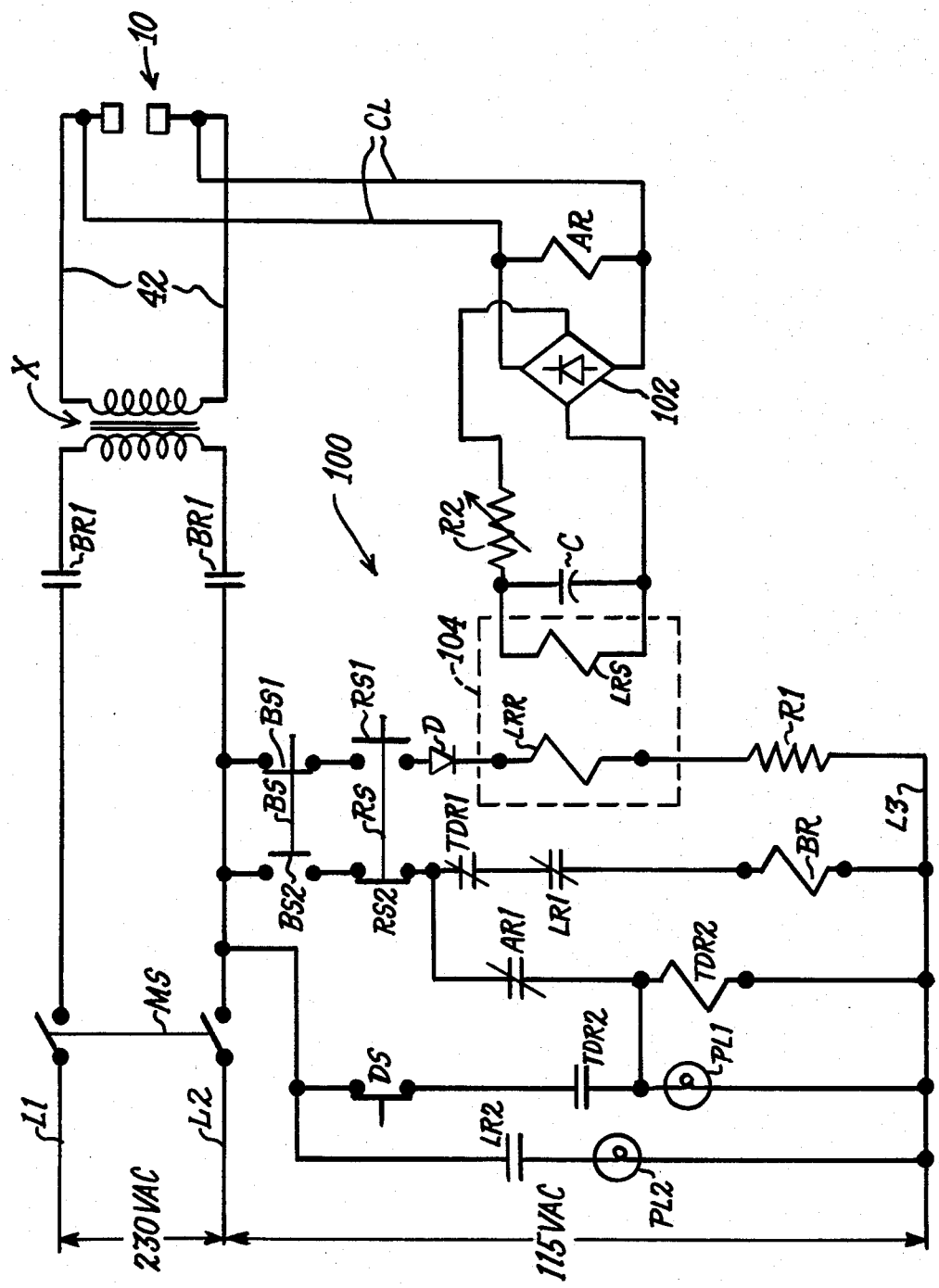
FIG. 8 is a circuit schematic diagram of an anti-arcing control circuit applicable to brazing tool such as that depicted in FIGS. 1 through 7.

Referring to the drawings, a brazing tool, generally indicated at 10 in FIG. 3, includes a generally L-shaped frame 12 having a longitudinally extending barrel 14 and a depending handle 16. The frame is formed from a structurally rigid insulative material, such as glass-filled polyester, in right and left halves, as best seen in FIG. 5, and held together by threaded fasteners 17 (FIG. 3). Barrel 14 is formed having a longitudinally upper passageway or bore 18 (FIG. 5) in which is accommodated an elongated support element in the form of a stainless steel tube 20, as best seen in FIG. 3. The support element is fixedly secured in bore 18 by transverse pins 21 (FIG. 3). Beneath bore 18, barrel 14 is formed having a second longitudinal passageway or bore 22, again as best seen in FIG. 5. From FIG. 6, it is seen that the barrel is relieved at 14a, and thus bore 22 is actually two longitudinally aligned but separated bores 22a and 22b. Secured in each of these bores is a tubular bushing 24 (FIGS. 3 and 6) which provide smooth sliding fits with a second elongated support element in the form of a stainless steel tube 26.

An elongated trigger 28 is formed from the same material as frame 12 in two halves and secured together by threaded fasteners 17, as seen in FIGS. 3 and 4. The upper, longitudinally extended portion of trigger 28 is formed having a longitudinal passageway or bore 30 which accepts the exposed portion of support element 26 extending between bores 22a and 22b in barrel 14. Pins 21 secure the trigger to this support element. To fix the angular position of this trigger-support element assembly, an elongated metal key 32 (FIGS. 5 and 6) is captured between the frame halves with its lower longitudinally extending portion exposed in frame relief 14a to serve as a rail which is engaged in a longitudinally extending notch 28a (FIG. 4) formed in trigger 28. Trigger 28 is thus depended from support element 26 in parallel relation with handle 16. A compression spring 34 carried on support element 26 biases the trigger to a forward position seen in FIGS. 3 and 6 in spaced relation to the handle. When the trigger is squeezed, bringing it rearwardly toward the handle, support elements 26 slides through bushings 24 to a retracted, rearward position.

Affixed to the rearward end of upper support element 20, such as by brazing, is a laterally extending current carrying link 36 (FIGS. 1 and 3) formed of a suitable conductor material such as brass. A similar link 38 is affixed to the rearward end of support element 26. Affixed to each of these links are separate, rearwardly extending male connectors 40 (FIG. 6) which connect with the female electrical connector terminations of a pair of trailing cables 42 seen in FIG. 3. The edges of links 36 and 38 are covered by a pair of conforming shields 44 (FIGS. 1 and 3) of insulative material to effectively isolate the operator's hand from these current carrying parts. Another similar conductive link 46 is brazed to the forward end of upper support element 20, while a more elongated conductive link 48 is brazed at a location intermediate its ends to the forward end of lower support element 26. An electrode holder 50 is affixed in electrical connection to the frontal side of link 46 in substantial longitudinal alignment with its support element 20 and accepts a carbon electrode 52 removably held in place by a cotter pin 53. The upper end of link 48 is formed to provide an electrode holder 54 for accepting a second carbon electrode 52, also removable retained by a cotter pin 53. As seen in FIGS. 1–3, these electrodes are in longitudinally opposed spaced relation. The lower end of link 48 is affixed in electrical connection to one end of a short conductive rod 56, whose other end is affixed in electrical connection with the lower end of yet another conductor link 58, as seen in FIGS. 1 and 3. This last link extends obliquely upward in underlying relation with the lateral extension of link 46 (FIG. 7).

As best seen in FIGS. 1 and 2, affixed to the laterally extended free ends of links 36 and 38, by suitable means such as bolts 60, are separate cable connectors 62. Similarly, bolts 64 affixed separate cable connectors 66 to the laterally extended free ends of links 46 and 58. Electrically connected between the longitudinally aligned upper set of connectors 62, 66 is a length of heavy current carrying, braided welding cable 68 (FIG. 2), while a similar length of welding cable 70 (FIG. 1) is electrically connected between the lower set of longitudinally aligned connectors 62, 66. These welding cable lengths are separately shielded by elongated, tubular insulators 72.

From the description thus far, it can be seen that half of the brazing current path through the tool is from one of the trailing cables 42 into link 36, through cable length 68 and, thence, through link 46 to the carbon electrode 52 mounted thereby. The other half of the brazing current path is from the other trailing cable into link 38, through cable length 70, link 58, rod 56 and link 48 to the other carbon electrode. Note that these brazing current paths shunt or bypass the support elements 20 and 26, and thus are not subjected to appreciable resistance heating, which would tend to degrade their structural rigidity and also heat up handle 16 and trigger 28 during protracted tool usage. To perform a brazing operation, the tool is grasped in one hand and manipulated to position carbon electrodes 52 in opposed relation with a workpiece 75 (FIG. 2) to be brazed. Trigger 28 is squeezed to retract support element 26, as seen in phantom in FIG. 6 and thus bring the electrodes into opposed, engaging relation with the workpiece. A brazing switch is then engaged to commence the flow of brazing current through the above-described current path halves which are completed by the workpiece itself. Upon completion of the brazing operation, the brazing switch is opened, and trigger is released. Spring 34 returns the retracted tool parts to their solid lines positions seen in FIG. 6. It will be appreciated that the angled, offset mounting of link 58 affords a widely unobstructed working space at the front end of tool 10 for more convenient access to the workpiece. It will be understood that support element 20 could be made retractable and support element 26 fixed to frame 12, and the operation of tool 10 would remain essentially the same. While the foregoing disclosure is cast in terms of a brazing tool, it will be appreciated that tool 10 could be utilized as a welding tool.

Turning to FIG. 8, there is shown the power circuit for providing brazing current to tool 10 and also an anti-arcing control circuit, generally indicated at 100, operating to interrupt the flow of brazing current in the event of arcing between the brazing electrodes and the workpiece. In some brazing applications, arcing should be avoided in order to prevent, not only undue erosion of the brazing electrodes, but more importantly the consequent spattering of metallic particles from the workpiece into the surrounding environment. For example, if the brazing tools are used to splice together coils of a transformer winding, these spattered conductor particles can foul the transformer's insulation system.

To this end, as seen in FIG. 8, an AC electrical power source, operating at a suitable voltage, e.g., 230 volts, is connected via lines L1 and L2 to drive the primary of a brazing transformer X with the closure of a double pole main switch MS and a pair of brazing contactor relay contacts BR1. The secondary of the transformer is connected by the brazing trailing cable 42, also seen in FIG. 3, to the tool 10 in supplying requisite low voltage, heavy brazing current to the tool electrodes. Running with the trailing cable are a pair of control leads CL which extend from electrical connections across the brazing electrodes back to the anti-arcing control circuit 100 where they are connected across the inputs of a full wave diode rectifying network 102 and the operating coil AR of an alarm relay. As will be pointed out, this alarm relay functions to detect any discontinuity in control leads CL which would totally defeat the anti-arcing purpose of control circuit 100. The full wave rectified DC output of network 102 is connected in series circuit with a variable resistor R2 and the set operating coil LRS of a DC bistable or latching relay, generally indicated at 104. Connected directly across this relay operating coil is a capacitor C. The parameters of resistor R2 and capacitor C are selected such that latching relay 104 responds to the existence of an arc voltage between the brazing electrodes.

The other or reset operating coil LRR of latching relay 104 is connected in series with the normally closed contacts BS1 or a manually operated braze switch BS, the normally open contacts RS1 of a manually operated reset switch RS, a diode D and a voltage dropping resistor R1 between line L2 of the brazing power circuit and a line L3. Lines L2 and L3 are connected with a suitable control circuit AC power source operating at, for example, 115 volts. Also connected across lines L2 and L3 is a series circuit including a normally open set of braze switch contacts BS2, a normally closed set of reset switch contacts RS2, normally closed contacts TDR1 of a time delay relay, normally closed contacts LR1 of latch relay 104 and operating coil BR of the braze contactor relay whose contacts BR1 operate in the brazing power circuit, as noted above. The operating coil TDR for the time delay relay is connected in series with normally closed contacts AR1 of the alarm relay between line L3 and the junction between reset switch contacts RS2 and time delay relay contacts TDR1. A second set of normally open time delay relay contacts TDR2 is connected in series with manually operated, normally closed dropout switch DS and a pilot light PL1 between lines L2 and L3, with the junction between the pilot light and relay contacts TDR2 directly connected to the time delay relay operating coil TDR. Finally, a second pilot light PL2 and a second set of normally open latch relay contacts LR2 are connected in series between lines L2 and L3.

To place the circuitry of FIG. 8 in a standby condition, main switch MS is closed. When a brazing operation is to be performed, brazing switch BS, which ideally is implemented as a foot switch, is actuated to hold its contact set BS2 closed. Activating current is drawn through contactor relay coil BR and its contacts BR1 close to energize the primary of brazing transformer X. If there is no break in control leads CL, alarm relay coil AR will be activated under open circuit voltage and normal brazing voltage conditions existing across the brazing electrodes. Alarm relay contacts AR1 immediately separate to open the energization circuit for operating coil TDR of the time delay relay. The brazing operation may then be carried through to completion as braze switch contacts BS2 are held closed. If, however, there is a break in the control leads CL, alarm relay AR will not pick up upon closure of braze switch contacts BS2, and the time delay relay operating coil TDR will thus be activated through normally closed contacts AR1. After a short delay, the time delay relay picks up, and its contacts TDR1 open to interrupt the energizing circuit for contactor relay coil BR. The contactor relay drops out even though braze switch contacts BS2 are held closed, and relay contacts BR1 separate to de-energize the primary of brazing transformer X. The brazing operation is thus interrupted. In addition, relay contacts TDR2 close to provide a self-holding energization circuit for the time delay relay coil TDR through normally closed dropout switch DS. Thus, the time delay relay remains picked up even with the release of braze switch BS. Coincidentally, pilot light PL1 is energized to provide a sustained visual signal that there is a discontinuity in control leads CL, and thus the anti-arcing control circuit is not operational. Pending repair of the control lead break, dropout switch DS may be opened to interrupt the holding circuit for coil TDR, and the time delay relay is dropped out. The reason for the utilization of a time delay relay is to avoid a race situation with the alarm relay, and thus insure that relay contacts AR1 have the opportunity to separate before relay contacts TDR1 attempt to separate.

If, during a brazing operation, poor electrical contact between the electrodes and the workpiece occurs, with consequent arcing, the increased voltage drop across the electrodes raises the voltage on capacitor C to a magnitude sufficient to drive current of activating level proportions through relay coil LRS. Latching relay 104 picks up, causing its contacts LR1 to open and interrupt the energization circuit for contactor relay operating coil BR despite sustained closure of braze switch contacts BS2. Relay contacts BR1 separate to interrupt the supply of brazing current to tool 10. Coincidentally, latching relay contacts LR2 close to energize pilot light PL2, visually signaling that the brazing operation has been interrupted because of arcing at the brazing electrodes.

To reset the control circuit 100 after having been tripped in response to arcing, braze switch BS must be released, and reset switches RS, which may also be foot operated, is actuated. Its contacts RS1 close to direct actuating current to reset coil LRR of latching relay 104 which is thereupon returned to its normal condition with contacts LR1 closed and LR2 open. Since, in the disclosed embodiment, latching relay 104 is a low voltage DC version, diode D and resistor R1 insure reliable resetting operation. It will be noted that by installing ganged sets of brazing switch contacts and reset switch contacts in both the brazing contactor relay coil and latching relay reset coil energization circuits, the brazing and reset command functions are effectively interlocked. Thus, the control circuit cannot be "teased" by concurrent actuations of the braze switch BS and reset switch RS.

It will be appreciated that the functions of the disclosed relays can be readily implemented using solid state electronic components.

It will thus be seen that the objects set forth above and those made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A pistol grip electrical brazing tool comprising, in combination:

an L-shaped member formed of structurally rigid insulating material having a depending handle portion and an elongated, longitudinally extending barrel portion, said barrel portion having an upper longitudinal passageway therethrough and a pair of longitudinally aligned lower passageways separated by a recessed section of said barrel portion;

an elongated upper support element accommodated in said upper passageway;

an elongated lower support element accommodated in said aligned second passageways, said lower support element being exposed at said recessed section of said barrel portion;

a trigger formed of structurally rigid insulating material affixed to the exposed portion of said lower portion element for disposal in parallel relation to said handle portion;

a spring acting between said handle portion and said trigger to bias said handle portion and trigger apart;

separate electrically conductive, laterally extending first links affixed to the rearward ends of said upper and lower support elements;

separate electrically conductive, laterally extending second links affixed to the forward ends of said upper and lower support elements;

electrodes removably affixed to said second links in longitudinally opposed relation;

brazing cable connectors affixed to said first links;

separate heavy current carrying conductors electrically connected between lateral extensions of said first and second links for shunting brazing currents between said electrodes and said cable connectors from said upper and lower support elements; and means affixing one of said support elements to said barrel portion such that squeezing said handle portion and trigger together against the bias of said spring reciprocates the other of said support elements to bring said electrodes into opposed engaging relation with a workpiece to be brazed.

2. The electrical brazing tool defined in claim 1, wherein said upper support element is affixed to said barrel portion.

3. The electrical brazing tool defined in claim 1, which further includes an elongated key secured in said barrel portion and spanning said recessed section thereof, said key slidingly engaging said trigger to prevent angular movement thereof.

4. The electrical brazing tool defined in claim 1, wherein said heavy current carrying conductors are lengths of cable, and further including insulative tubular members shielding said cable lengths.

5. The electrical brazing tool defined in claim 4, which further includes conforming insulative shrouds shielding said first links.

6. The electrical brazing tool defined in claim 1, wherein the one of said second links affixed to said lower support element comprises a vertically oriented first sub-link affixed at a location intermediate its ends to said lower support element, one of said electrodes being affixed to the upper end portion of said first sub-link, a second sub-link electrically connected at its one end portion to one of said heavy current carrying conductors, and a rigid, electrically conductive rod affixed between the lower end portion of said first sub-link and the other end portion of said second sub-link.

7. The electrical brazing tool defined in claim 6, wherein said upper support element is affixed to said barrel portion.

8. The electrical brazing tool defined in claim 1, wherein said spring is a coiled compression spring carried by said lower support element at a location between said trigger and said handle portion.

* * * * *